United States Patent [19]

Cuffia

[11] 4,404,553
[45] Sep. 13, 1983

[54] LANDING LIGHT PATTERN GENERATOR FOR SIMULATOR WITH SELECTIVE ADDRESSING OF MEMORY

[75] Inventor: Robert P. Cuffia, San Jose, Calif.
[73] Assignee: The Singer Company, Binghamton, N.Y.
[21] Appl. No.: 204,975
[22] Filed: Nov. 7, 1980
[51] Int. Cl.³ ............................................. G09G 1/00
[52] U.S. Cl. ........................... 340/728; 340/27 NA; 340/723; 273/DIG. 28; 358/104
[58] Field of Search ................... 434/41, 43, 69, 239; 273/DIG. 28; 340/27 NA, 723, 724, 728, 747, 750, 793; 358/104

[56] References Cited

U.S. PATENT DOCUMENTS

| | | | |
|---|---|---|---|
| 3,081,557 | 3/1963 | Mailhot | 434/42 |
| 3,380,028 | 4/1968 | Gustafson et al. | 340/721 |
| 3,623,240 | 11/1971 | Wood | 434/42 |
| 3,784,969 | 1/1974 | Wilckens | 340/27 NA |
| 4,210,930 | 7/1981 | Henry | 340/27 NA |
| 4,263,726 | 4/1981 | Bolton | 434/43 |
| 4,297,691 | 10/1981 | Kodama et al. | 340/793 |

*Primary Examiner*—Marshall M. Curtis
*Attorney, Agent, or Firm*—Douglas M. Clarkson; Jeff Rothenberg

[57] ABSTRACT

The disclosure is of a system for steering a landing light pattern by storing data to increase the illumination intensity for each picture element by a selected amount along a scanline in a memory circuit (11) and, then, addressing the memory circuit to begin its readout at predetermined starting points. A skewing or warping of the light pattern is obtained by applying a displacement factor to the beginning point for each successive scanline, so that each scanline is read out beginning at a progressively different point to cause the shape of the landing light pattern to be varied in a predetermined manner.

10 Claims, 10 Drawing Figures

LANDING LIGHT PATTERN GENERATOR FOR SIMULATOR WITH SELECTIVE ADDRESSING OF MEMORY

BACKGROUND OF THE INVENTION

This invention, generally, relates to electronic systems and circuits for generating various scenes digitally in a continuously changing pattern and, more particularly, to a light pattern generator for use in simulators.

The generation of perspective images on a television screen is well known, and systems for generating such perspective images are equally well known. For example, such systems permit three-dimensional objects to be drawn electronically upon a cathode ray tube, but such systems are impractical for use in simulator apparatus primarily because they do not permit a scene to be changed continuously. The use of such digitally generated perspective images for a simulator requires complete control over the visual scene to permit such a scene to be changed by the trainee.

The invention described and claimed herein is an improvement over an invention by Randy W. Moore entitled Landing Light Pattern Generator for Digital Image Systems, filed on Nov. 4, 1980, Ser. No. 203,913 (now U.S. Pat. No. 4,348,184) and assigned to the same Assignee as the present invention.

SUMMARY OF THE INVENTION

It is a primary object of the present invention to provide a new and improved system for use on a light pattern generator for digital image systems in a simulator apparatus.

In accordance with a presently preferred form of the invention, the above, other and further objects are achieved in a system for developing a scene from information obtained from data generated for that purpose and from stored data, and the system having at least one display device to display the scene. The system includes data storage means and control means to generate data, the total being a composite scene depicted on a display device. Connected also to the display device is means to vary the intensity of a portion of the displayed scene, and in accordance with the present invention, the portion of the displayed scene in which the intensity is varied is also moveable in a predetermined manner.

DESCRIPTION OF THE DRAWINGS

The present invention will become more readily understood from the following detailed description taken in conjunction with the drawings, in which.

THEORY

This section relates to the generation of landing light patterns off-line and the displaying of such patterns under real-time computer control. The landing light pattern is achieved by the generation of additional illumination for each picture element along a scanline and is represented by the equation $$I_{PE} = (\overline{SN} + DIL + I_{LL})R \qquad (1)$$

where $\overline{S}$ represents the directional illumination of the scene due to the sun vector, $\overline{N}$ represents the normal surface vector, $DIL$ is the diffuse illumination of the scene, $I_{LL}$ is the illumination of the scene due to the landing lights, and $R$ is the reflectance of the object as coded in the data base.

Each picture element along a scanline in a scene generated digitally is illuminated in accordance with the equation $$I_{PE} = (\overline{SN} + DIL)R \qquad (2)$$

from this equation (2), the following equation obtains $$I_{PE} = (\overline{SN} + DIL)R + I_{LL}R \qquad (3)$$

The above relationships indicate that the landing light illumination is effected by adding the additional intensity to the scene as it is generated digitally in the computer.

Figure 1:
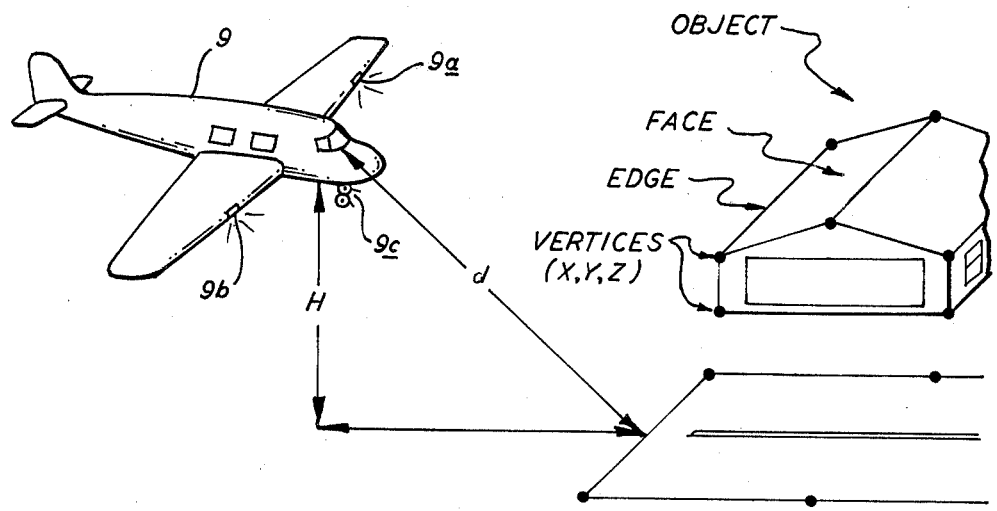
FIG. 1 is a drawing in perspective representing pictorially certain component parts for the purpose of describing the invention.

Referring now to FIG. 1 of the drawings for additional explanation of background for the present invention, an "object" is formed by a plurality of vertices or points indicating particular X, Y, Z coordinates on a flat, two-dimensional screen, but these vertices are arranged in a predetermined pattern so that appropriate lines drawn between selected vertices will form "edges" and thereby define the object. A "face" is a flat surface that is defined by adjacent edges.

In this manner as clearly represented in FIG. 1, various three-dimensional objects are represented on a two-dimensional screen, and this feature is utilized by existing circuits in accordance with the prior patents identified herein above. An aircraft is represented by the numeral 9 and may have landing lights 9a and 9b located in the leading edge of the wings.

Alternatively, some types of aircraft may have a landing light located on the nose wheel support, and such is indicated by the numeral 9c. The letter H indicates the height of the aircraft above the object being viewed on the screen at any particular predetermined instant in time, and the letter d indicates the actual distance from the object along the line of sight at that time.

Figure 2:
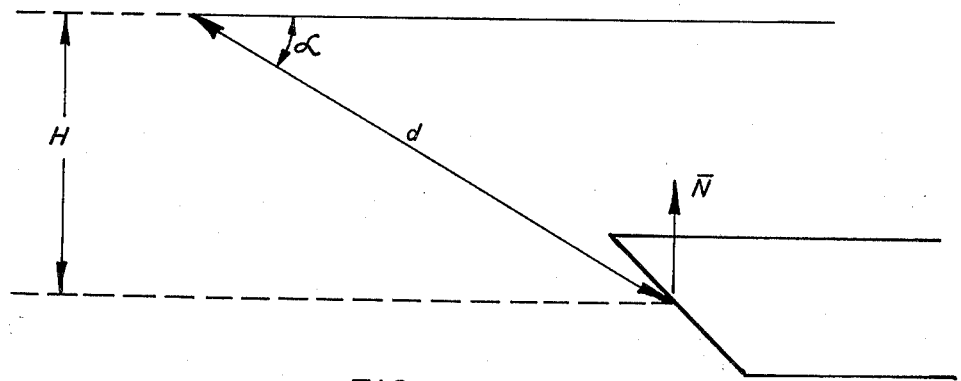
FIG. 2 is a vector diagram to illustrate certain features in the instances where the light originates from the eyepoint source.

FIG. 2 of the drawings indicates that the landing lights are a source of illumination which is highly directional (like the sun). Accordingly, the following relationship represents this illumination.

$$I_{LL} = \overline{L}\overline{N}$$

N, being defined above, is the normal surface vector and, as such, is usually directed upwardly. A projection of L upon N is obtained by the relationship $$\cos(90° - \alpha) = \sin \alpha.$$

The magnitude of $\overline{L}$ is formed by some initial intensity I, divided by the distance squared to the ground. Thus, $$\begin{aligned} I_{LL} &= \overline{L}\,\overline{N}\cos(90° - \alpha) \qquad (4)\\ &= I/d^2/\sin\alpha \\ &= I/H^2/\sin^2\alpha)\sin\alpha \\ &= I/H^2 \sin^3\alpha \end{aligned}$$

The landing light pattern is generated as if it is viewed at the eyepoint of the pilot (trainee). Therefore, since the landing light in actuality originates from a lamp positioned on the landing gear, the difference can be substantial in the configuration of a pattern laid out on the ground. In accordance with the present invention, however, the landing light pattern that is generated is as if it would appear when viewed from the eyepoint position.

Figure 3:
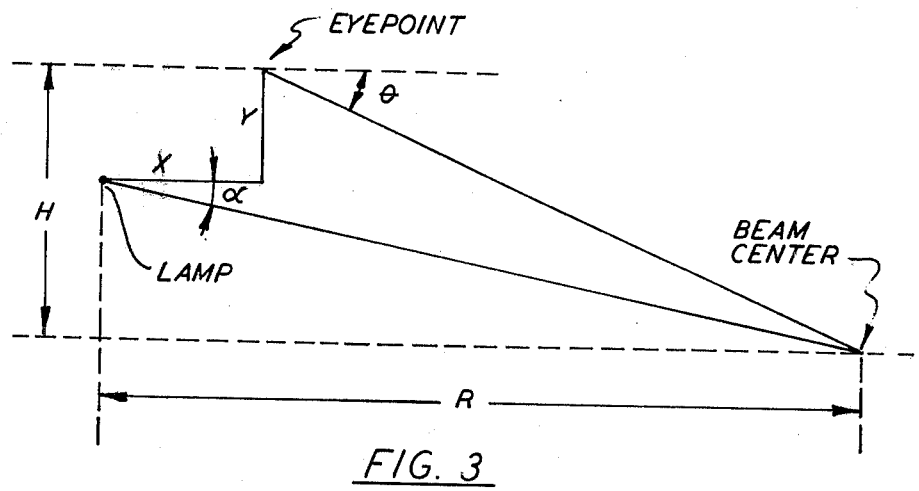
FIG. 3 is a vector diagram similar to that shown in FIG. 2, but showing the light source originating at a point below and behind the eyepoint.

Referring now to FIG. 3 of the drawings, the landing lights are located a distance X behind the eyepoint and Y below the eyepoint. The landing lights are aimed downward at an angle $\alpha$ and are viewed at an angle $\theta$ down the horizontal. As an example of these distances, a Boeing 747 has the following approximate dimensions: X=50 Ft., Y=16 Ft., H=28 Ft. (when parked), and $\alpha$ is about 5°.

DETAILED DESCRIPTION OF THE INVENTION

Figure 8:
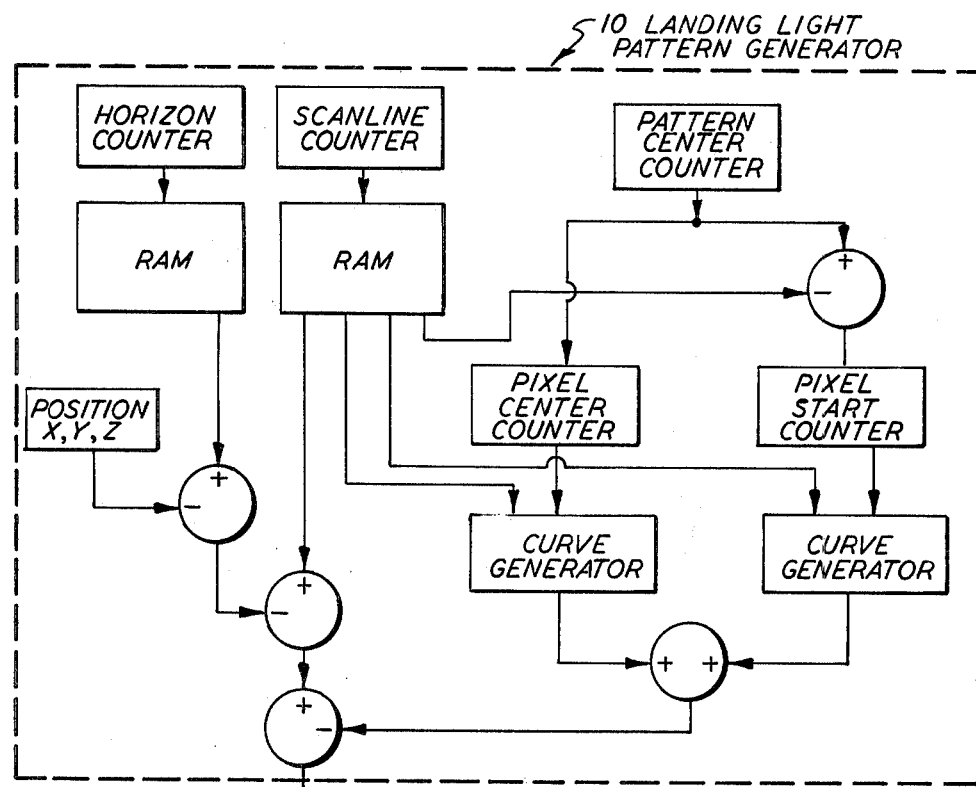
FIG. 8 is a circuit diagram in block form to illustrate how the present invention fits into a landing light pattern generator circuit.
Figure 8:
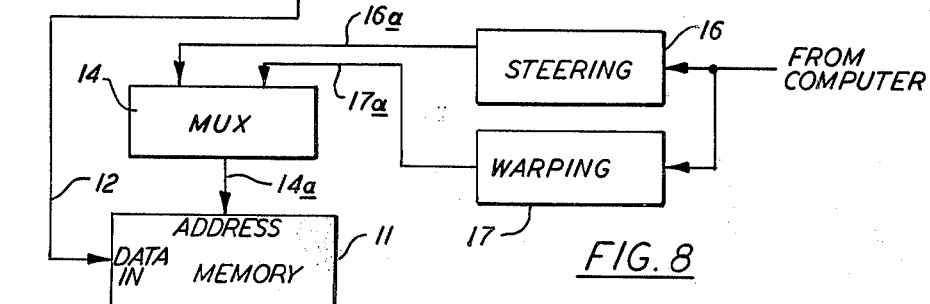

Referring now to FIG. 8 of the drawings, a landing light pattern generator for generating an additional illumination intensity as would appear on predetermined picture elements in a simulator apparatus is identified generally by the reference numeral 10. For a more complete description of this particular landing light pattern generator 10, reference is made to an invention of Randy W. Moore entitled "Landing Light Pattern Generator for Digital Image Systems" filed on Nov. 4, 1980, now U.S. Pat. No. 4,348,184) and assigned to the same Assignee as the present invention.

Data generated by the landing light pattern generator 10 is stored in a memory circuit 11, and steering is obtained in accordance with this aspect of the present invention, by addressing various points along the table of intensities stored in the memory circuit 11.

Figure 9:
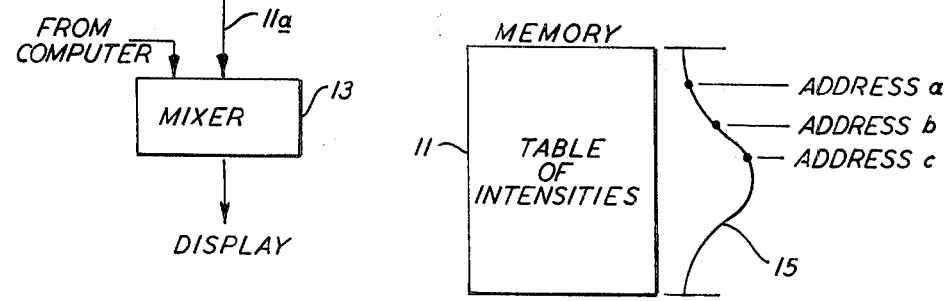
FIG. 9 is a diagrammatic illustration of a memory element for the purpose of describing the invention.

Data stored in the memory circuit 11 is received over a terminal 12, whereas the output over a terminal 11a is obtained by addressing this data at different points as determined by signals at an address terminal 14a, which is selected by a multiplexer circuit 14 from either of two input terminals 16a or 17a. As better illustrated in FIG. 9 of the drawings, the data stored in the memory circuit 11 is representative of a Table of Intensities, as illustrated by the curve 15 in FIG. 9. The operation of this inventive circuit is obtained by addressing different points along the curve 15, such as the point a, b or c.

To illustrate the invention further, to steer the landing light to the left, points a, b and c may be selected in sequence for each of three successive scanlines. The point c is indicative of the landing light being nearly half off the screen and out of view.

Referring back to FIG. 8, an address signal is obtained on the connection 14 from any number of suitable circuits depending upon the movement desired in the intensity curve for the landing lights. For example, two movements are indicated by the circuits 16 and 17. The steering circuit 16 will move the entire landing light pattern, without interruption, whereas the warping circuit 17 will move parts of the landing light pattern at different speeds for each scanline in order to obtain distortions as would normally occur in the real world.

Figure 4:
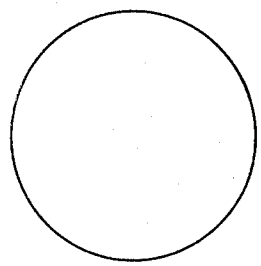
FIG. 4 is a diagrammatic illustration of a light pattern shining on a wall directly in front of the eyepoint.
Figure 5:
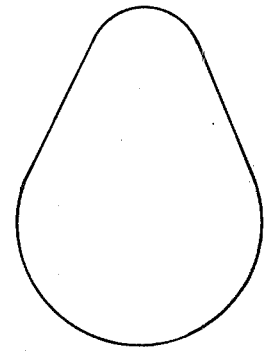
FIG. 5 is a pictorial representation of a light pattern as would be visible if the light pattern of FIG. 4 is pivoted 90° away from the observer.

To illustrate this further, refer briefly to FIG. 4 of the drawings which illustrates, generally, the shape of the pattern made upon a vertical surface directly in front, and FIG. 5 shows the general shape of this pattern if the vertical surface is laid down horizontally.

Figure 6:
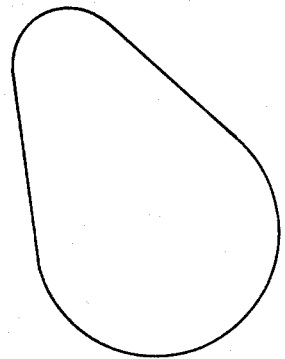
FIG. 6 is a diagrammatic illustration of a light pattern of FIG. 5 but with the light shining to the left of the eyepoint.
Figure 7:
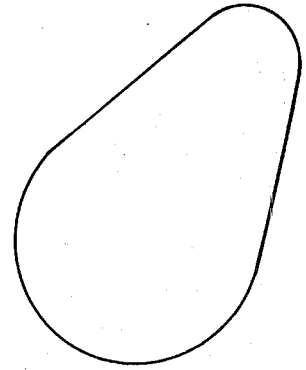
FIG. 7 is a view similar to that of FIG. 6 but with the light pattern steered to the right.

FIG. 6 shows a view like that of FIG. 5 but with the pattern warped, or skewed, to the left, as a light would actually appear in the real world if steered in that manner. FIG. 7 is a view similar to FIG. 6 but with the light pattern steered to the right in order to develop the warped, or skewed, pattern as illustrated.

The output of the memory circuit 11, in FIG. 8, over the connection 11a is to a mixer circuit 13, which is as disclosed in the above identified invention by Randy W. Moore.

Figure 10:
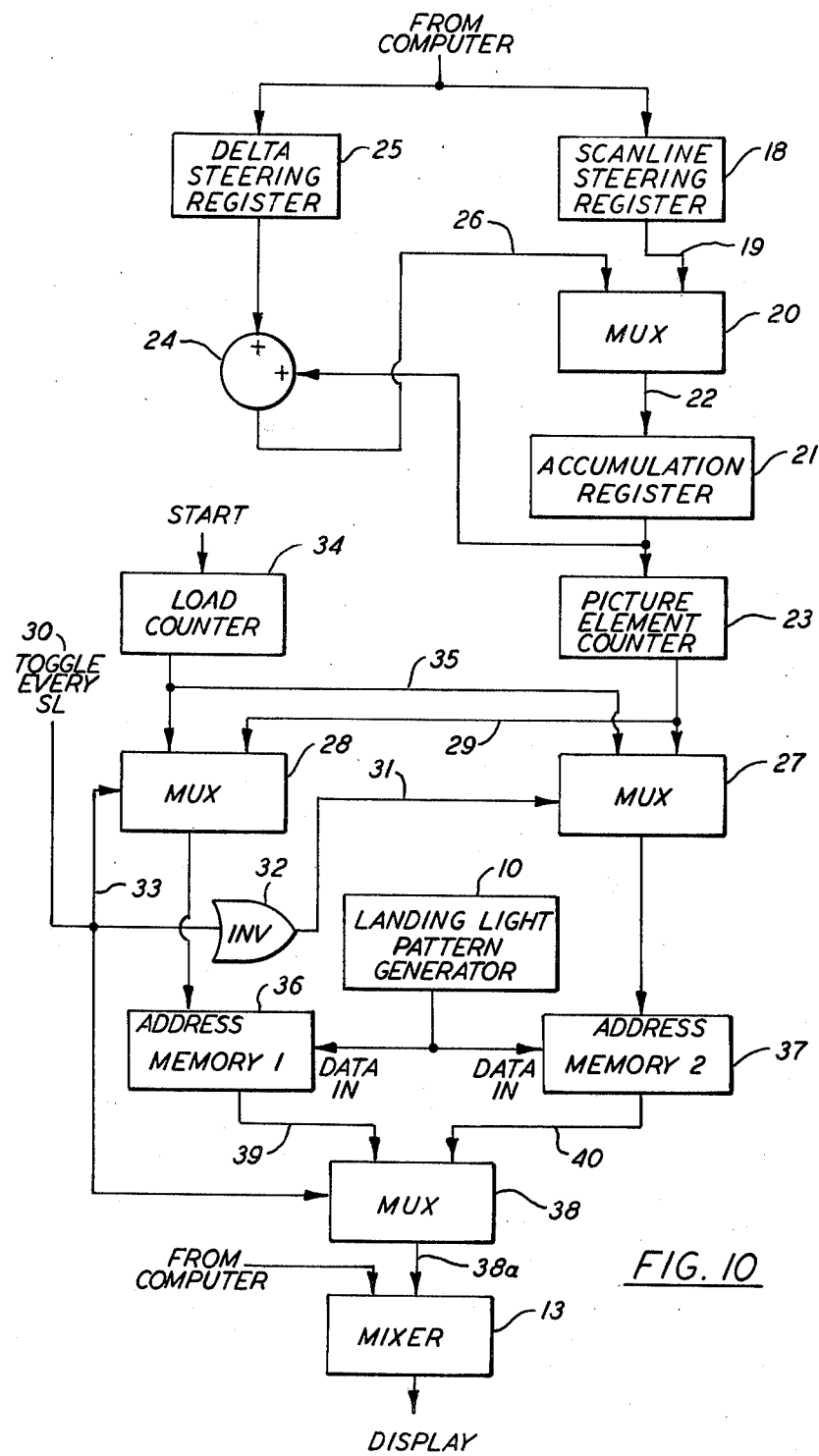
FIG. 10 is a circuit diagram in block form of a circuit to accomplish the features and objects of the present invention.

To explain the straight steering function of the present invention in greater detail, reference is made to FIG. 10 of the drawings. A scanline steering register 18 is initiated by the usual signal from the computer, as explained in greater detail in the above identified invention by Randy W. Moore, in order to generate data over a connection 19 to a multiplexer circuit 20.

When the multiplexer circuit 20 selects the terminal 19, this steering data is connected to an accumulation register 21 over a line 22. The steering data that is accumulated in the register 21 is connected directly to a picture element counter circuit 23 as well as simultaneously to an adder circuit 24, where it is added to the data from a "delta" steering register 25.

The application of the output of the delta steering register 25 to the steering data in the adder circuit 24 is to apply to each scanline a different factor, either to delay the illumination intensity data or to advance it accordingly.

The output of the adder circuit 24 is connected over a line 26 as a second input to the multiplexer circuit 20 so that, for the next scanline, the data will be stepped over by a predetermined amount. The picture element counter circuit 23 keeps track of the data and keeps it orderly. The output of the picture element counter circuit 23 is connected to both multiplexer circuits 27 and 28 over a common connection 29.

A toggle signal source is identified by the reference numeral 30 and is applied to the multiplexer circuit 27 over a line 31 after going through an inverter circuit 32. The same output from the toggle signal source 30 is applied, without inverting, over a line 33 directly to the multiplexer circuit 28.

A "load" counter circuit 34 is initiated by an appropriate start signal in order to provide a signal to the multiplexer circuits 27 and 28 over a common connection 35.

By this arrangement of circuits and connections, the output of the landing light pattern generator 10 is connected, first, to one memory circuit 36 for one scanline and, then, to a second memory circuit 37 for the next scanline, alternating down the screen, scanline by scanline. The data output from the memory circuit 36 is connected to a multiplexer circuit 38 over an output line 39, and the data output from the memory circuit 37 is connected similarly to the multiplexer circuit 38 over an output line 40.

Responsive to the toggle signal source 30, the multiplexer circuit 38 will select, first, the data over the output line 39 for one scanline and, then, the data over the output line 40 for the next scanline, alternating scanline by scanline. The data output from the multiplexer circuit 38 is connected over the lead 38a to the mixer circuit 13, as referred to hereinabove.

The operation of this circuit will now be described in some detail. The particular landing light intensity value which is produced by the pattern generator 10 for each picture element along one scanline is stored in one of the memory circuits.

During the next scanline, each of these values of the illumination intensity for the picture elements is read out, receives further processing and is displayed. While the values for this particular scanline are being read out, values for the next scanline are being stored in the other memory circuit, as they are produced by the landing light pattern generator 10.

Therefore, each scanline memory circuit 1 and memory circuit 2 alternate reading and writing functions. The particular memory circuit into which data is being written has the load counter circuit 34 furnishing the address, while the other memory circuit, whose data is being read out, receives its address from the picture element counter circuit 23.

The accumulation of data from the scanline steering register 18 with a factor from the delta steering register 25 for each picture element on each successive scanline causes the pattern to skew or warp, because the landing light intensities from scanline to scanline are displaced relative to each other.

A circuit in accordance with the present invention applies equally to a horizontal scan system or to a vertical scan system.

While the invention has been disclosed and described using particular circuit components, it may be practiced also by using the logic elements in a digital computer along with proper programs. The particular counting described may also be provided to the disclosed embodiment from a computer, as may be various other functions described. Any number of possible combinations of computer logic and hardware are possible without deviating from the true spirit and scope of the invention which is intended to be defined by the claims appended hereto.

I claim:

1. In a system for developing a predetermined simulated scene at a time of reduced visibility from information obtained from data generated digitally and from data stored electronically, and for displaying said reduced visibility scene on a display device with portions of increased illumination as if by a spot light, said system comprising:

data storage means for receiving data representative of predetermined scenes, control means for generating data in order to select a predetermined scene, a display device connected to receive data from said data storage means and to display scenes selected by said control means, means connected to said display device to increase the illumination intensity of portions of said displayed reduced visibility scene in accordance with a preselected pattern as if projected by a spot light and unrelated to the information in said scene, and said means connected to said display device including memory circuit means to store data representative of a Table of Intensities with means for addressing the Table of Intensities at different points, whereby the preselected spot light pattern of increased illumination intensity is moved in a predetermined manner.

2. In a system for developing a predetermined scene as set forth in claim 1 wherein said means connected to said display device includes at least two memory circuits to store alternately by scanline data from said means connected to said display device.

3. In a system for developing a predetermined scene as set forth in claim 1 wherein said means connected to said display device includes at least two memory circuits to store alternately by scanline data from said means connected to said display device, and multiplexer circuit means while the other is being loaded and, then, when the scanline data is complete to switch to the other of said memory circuit means and receive the next succeeding scanline data stored therein.

4. In a system for developing a predetermined scene as set forth in claim 1 wherein said means connected to said display device includes steering circuit means connected to address said memory circuit means to select the point of beginning for the data output terminal.

5. In a system for developing a predetermined scene as set forth in claim 1 including warping circuit means connected to control the point of beginning for the data stored in said memory circuit means, so that the point of beginning is different for each successive scanline, thereby causing said spot light pattern to be shaped in a predetermined manner.

6. In a system for developing a predetermined scene as set forth in claim 1 wherein said means connected to said display device includes at least two memory circuits to store alternately by scanline data from said means connected to said display device, steering circuit means connected to the address terminal of each memory circuit to control the output therefrom by scanline beginning point, so that the spot light pattern is formed in a predetermined manner.

7. In a·system for developing a predetermined scene as set forth in claim 1 wherein said means connected to said display device includes at least two memory circuits to store alternately by scanline data from said means connected to said display device, warping circuit means to control the point of beginning for the data being connected to said display device, so that it begins at a progressively different point along each successive scanline.

8. In a system for developing a predetermined scene as set forth in claim 1 wherein said means connected to said display device includes at least two memory circuits to store alternately by scanline data to increase the illumination intensity of portions of said displayed scene, scanline steering register means connected to control the output selectively of each of said memory circuits to begin the output of the data stored in each at a different point in order to cause movement in said preselected spot light pattern in a predetermined manner.

9. In a system for developing a predetermined scene as set forth in claim 8 wherein said means connected to said display device includes separate circuit means connected in parallel with said scanline steering register means in order to affect the shape of said preselected spot light pattern in a predetermined manner.

10. In a system for developing a predetermined scene as set forth in claim 9 wherein said means connected to said display device includes load circuit counter means connected in parallel with said parallel connected circuit means in order to cause the output of said two memory circuits to be loaded in an undistorted and orderly manner, and multiplexer circuit means separated from the output of each memory circuit to select which of the controls shall be applied to address each of the two memory circuits.

* * * * *